(12) United States Patent
Furbish et al.

(10) Patent No.: US 6,257,275 B1
(45) Date of Patent: Jul. 10, 2001

(54) PRESSURE REDUCING VALVE

(75) Inventors: Thomas J. Furbish; Robert G. Ledbetter, both of Del Ray Beach, FL (US)

(73) Assignees: Liberty Group, Clarence Center, NY (US); Scuba Technologies, Inc., Lawrenceville, GA (US)

( * ) Notice: Subject to any disclaimer, the term of this patent is extended or adjusted under 35 U.S.C. 154(b) by 0 days.

(21) Appl. No.: 09/550,199

(22) Filed: Apr. 17, 2000

(51) Int. Cl.[7] ................................................ G05D 16/02
(52) U.S. Cl. .................... 137/505; 137/505.28; 405/185; 405/193
(58) Field of Search .................. 137/505.11, 505.28; 405/185, 193

(56) References Cited

U.S. PATENT DOCUMENTS

| | | | |
|---|---|---|---|
| 2,147,850 | * 2/1939 | MacLean | 137/505.11 X |
| 2,696,714 | * 12/1954 | Hughes | 137/505.11 X |
| 4,226,257 | * 10/1980 | Trinkwalder | 137/81.2 |
| 5,307,834 | * 5/1994 | Tatarek-Gintowt et al. | 137/505.11 |
| 5,551,800 | * 9/1996 | Hobelsberger | 405/186 |

* cited by examiner

Primary Examiner—Stephen M. Hepperle
(74) Attorney, Agent, or Firm—Rodgers & Rodgers

(57) ABSTRACT

A pressure regulator for breathing apparatus controlled by a diaphragm, piston or bellows having one face exposed to a reference pressure which is automatically maintained at a level substantially the same as ambient pressure by means of a metering valve communicating with pressure at the regulator outlet and operated by a flexible diaphragm exposed to ambient pressure, and a pressure relief valve to vent excess reference pressure to the outside of the regulator.

3 Claims, 2 Drawing Sheets

PRESSURE REDUCING VALVE

BACKGROUND OF THE INVENTION

This invention relates to improvements in valves for regulating gas pressure, particularly valves used to regulate the pressure of breathing gas in self-contained underwater breathing apparatus, commonly referred to by the acronym SCUBA. In such apparatus, air, or other breathable combination of gases, is stored under high pressure in one or more cylinders carried by the diver. It is necessary for the gas to be supplied to the diver at the same pressure as the surrounding water, which varies with depth, and at a rate which matches his respiratory requirements. These functions are performed by a pressure and flow regulating arrangement commonly referred to as a SCUBA Regulator or Demand Regulator. Similar regulators are also used in self-contained breathing apparatus for purposes other than diving, such as in firefighting, rescue and escape apparatus, which protect the wearer from irrespirable atmospheres. The present invention may be applied with advantage to any such regulator.

Depending upon the design of the cylinder(s) used to store the gas, the fully charged pressure may vary between about 2200 and 4500 psig and, as gas is consumed during use, the pressure may fall to as little as 200 psig at the end of the useful duration of the apparatus. Because of this considerable variation in the pressure of the stored gas, it is usual for SCUBA regulators to be composed of two distinct valve assemblies, commonly referred to as stages. The first stage, which connects to the outlet of the cylinder(s), is a pressure reducing valve, or pressure regulator, the purpose of which is to reduce the stored gas pressure to a substantially constant pressure, typically on the order of 130 psi. The reduced pressure is supplied, via an interconnecting flexible hose, to the second stage or demand valve, so called because it supplies gas to the diver on demand. It is important that the reduced pressure be maintained at a relatively constant level for the demand valve to operate properly.

There are several designs of pressure regulator in common use and, while they may vary considerably in construction details, all are required to perform the same basic functions. These pressure regulators utilize a spring loaded piston, diaphragm or bellows as a control mechanism to reduce the cylinder pressure. During a dive, the ambient pressure rises as the depth increases. At approximately 10 meters, the absolute ambient pressure is twice that at the surface, and the pressure increases an additional atmosphere for each additional 10 meters. If no means were provided to compensate for this increase in ambient pressure, the difference between the pressure regulator output pressure and the diver's lung pressure would significantly decrease as the diver descended, thus decreasing the maximum flow possible. Eventually the pressure regulator would not be able to supply sufficient air to the diver at even moderate work rates. Consequently, all pressure regulators have some provision for compensating for the change in ambient pressure throughout a dive.

The most common means of compensating for change in ambient pressure is to allow the surrounding water to freely enter the pressure regulator to transmit the ambient pressure to the control mechanism. This simple expedient has a number of disadvantages. First, moving seals are thus exposed to water which very often contains small abrasive particles in suspension The seals are normally lubricated with a synthetic grease to which the particles adhere. Causing abrasion to the sealing surfaces and to the seals themselves which results in leakage of gas past the seals and a general reduction in the useful life of the pressure regulator. The problem is compounded by the accumulation of salts dissolved in the water, being deposited as a solid crust in the sealing areas by evaporation of water remaining in the pressure regulator after use.

A further and potentially dangerous result of allowing water into the interior of the pressure regulator is that of the water freezing inside the pressure regulator during use and preventing movement of the control mechanisms. The rapid expansion of gas through the regulator, from high to low pressure, causes a considerable drop in temperature during use, particularly when the diver is breathing heavily and, in cold water, ice can form inside the pressure regulator causing it to totally fail.

Pressure regulators for use under adverse conditions and in cold water have to be protected from the ingress of water while still allowing ambient pressure to act on the control mechanisms. There are presently two commonly used methods to achieve this. The first and most common method is to fill the interior of the pressure regulator with a fluid with a freezing temperature lower than water such a glycol or, more usually, silicone grease. If the fluid is a liquid, it has to be sealed into the pressure regulator by means of a flexible diaphragm capable of transmitting water pressure to the fluid and hence to the piston head. A viscous grease is also used without a diaphragm but with very small fill ports to minimize loss of grease. However, as the control mechanism moves in use, the grease is displaced and can gradually become replaced with water. Both methods require complete filling of the pressure regulator without any voids and are messy and inconvenient, severely hampering routine maintenance.

An improved arrangement, described in U.S. Pat. No. 4,226,257, consists in sealing the pressure regulator, save for a small pressure relief valve in the form of a rubber mushroom having its outer face exposed to the surrounding water. A small orifice, or fine sintered metal plug, admits a very limited but continuous flow of gas from the outlet port area into the control mechanism. The flow of gas will cause pressure to rise to the level required to open the pressure relief valve, which will then vent the excess continually into the surrounding water. By this means, pressure inside the pressure regulator is maintained at a level very slightly above that of the surrounding water. The arrangement has the merit of keeping the pressure regulator clean and dry, and does not hinder dismantling and maintenance of the regulator. However, there are disadvantages to the arrangement. Firstly, the very fine orifice or sintered plug, which meters gas can become clogged by impurities or by improper handling and thus impair the controlled flow. Also, because flow is kept small so as to limit the loss of breathing gas, the system cannot compensate for rapid increases in depth and there are circumstances in which this limitation can be dangerous to the diver.

SUMMARY OF THE INVENTION

The present invention overcomes all the disadvantages previously described by adding a simple auxiliary mechanism to the standard, well-proven control system of a spring-loaded piston, diaphragm or bellows regulator. An external diaphragm senses ambient pressure continuously and operates a metering valve to automatically supply gas as needed from the outlet to the control mechanism as ambient pressure rises. A relief valve vents excess internal pressure during ascent. In this manner the invention maintains a dry regulator which is in equilibrium with ambient pressure at all times and eliminates the waste of breathing air for control purpose.

BRIEF DESCRIPTION OF THE DRAWINGS

These and other features and advantages of the present invention will become apparent from consideration of the following specifications when taken in conjunction with the accompanying drawings in which.

DETAILED DESCRIPTION OF THE EMBODIMENT

Figure 1:
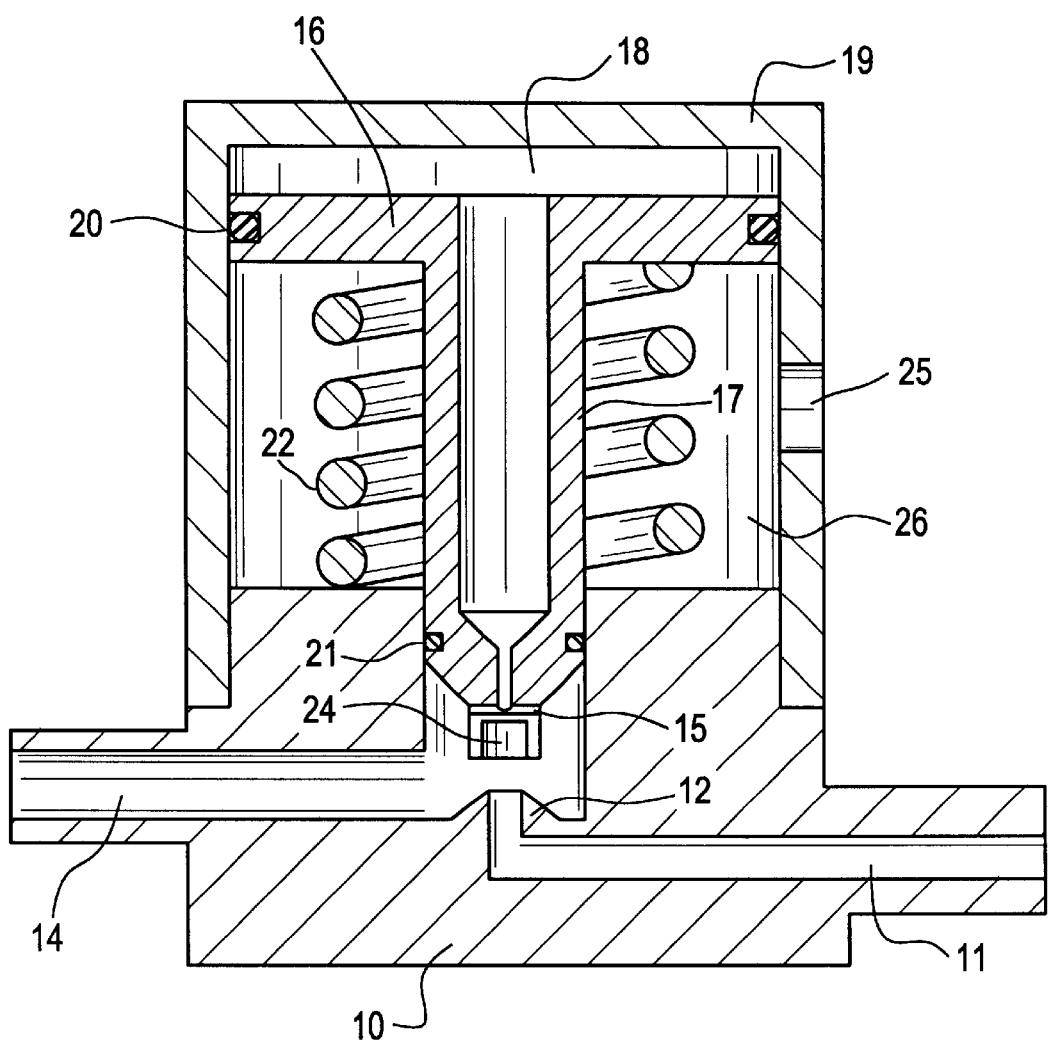
FIG. 1 is a diametrical cross-sectional view showing a prior art regulator valve using a spring-loaded piston control mechanism; and, FIG. 2 is a view similar to FIG. 1, but showing a valve having the improvements in accordance with the present invention.

Referring now more particularly to drawing and to that embodiment of the invention here presented by way of illustration, it is important to understand the construction and operation of the prior art regulator valve. For such an understanding attention is directed to FIG. 1 of the drawings which is a cross-sectional view through one of the simpler and most commonly used designs of regulator.

High pressure gas from the cylinder(s) enters the valve body 10 through inlet port 11 and passes through a control valve having a conical opening 12 to outlet port 14 and via a hose (not shown) to the demand valve (not shown). Assuming the demand valve to be closed, the incoming gas causes pressure to rise in the hose and, hence, in the outlet port. This pressure rise is communicated via a cross hole 15 in a movable piston 17, through the hollow stem of the piston to a space 18 enclosed by the enlarged head of the piston and cap 19. The piston head is sealed at its periphery to the bore of the cap by a sliding seal 20. The rising pressure acts upon the piston head 16, pushing it against the spring 22. When the rising pressure on the piston head compresses the spring sufficiently the resilient seat 24 in the piston seals against the opening 12, thus closing off the supply of gas.

When the demand valve is opened, pressure in the hose, and hence in the outlet port 14 and the closed space 18 above the piston head, will fall allowing the spring 22 to push the piston away from the conical opening 12 and allow gas to flow once again from the opening through the control valve to the outlet port. The outlet pressure at which the valve opens and closes is mainly dependent on the force applied to the piston by the spring 22 and is thus substantially constant. To ensure that the outlet pressure remains constant relative to ambient water pressure during a dive, the underside of the piston head is exposed to surrounding water via one or more openings 25 in the cap 19.

Figure 2:
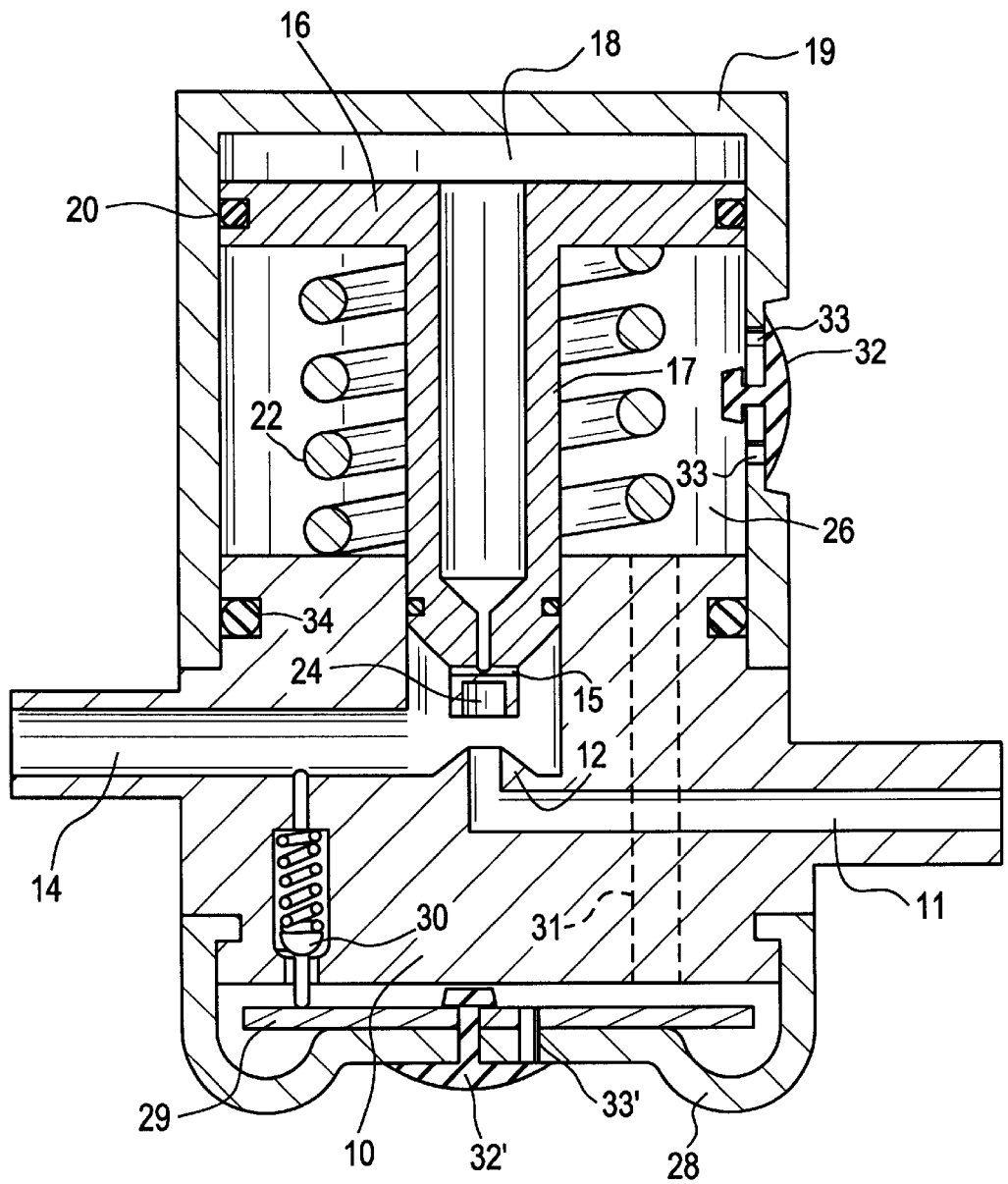

It will be seen in FIG. 2 that, in addition to the components and features already described, the pressure regulator according to the present invention also has a deal 34 to isolate the spring chamber 26. The controls of the present invention include a flexible diaphragm 28, with rigid plate 29 attached, said diaphragm sealed with respect to the body 10, and a small metering valve 30 selectively connecting the outlet port 14 with the interior of the diaphragm 28. An opening 31 extends between the interior of the diaphragm 28 and the chamber 26: and, there is a pressure relief valve in the wall of the chamber 26, the relief valve including at least one hole 33 covered by a flexible rubber valve member 32. Alternatively, the relief valve can be positioned in the center of diaphragm 28 to include hole 33' covered by flexible rubber valve member 32'.

During descent the increasing ambient pressure causes the diaphragm 28 to move toward the valve body 10 thereby compressing the internal air. As the diaphragm moves inward, the rigid plate 29 contacts the metering valve 30 and opens it allowing a flow of gas from the outlet port area to travel under the diaphragm and via opening 31 into the spring chamber. When sufficient gas has entered the chamber to equalize the internal and ambient pressures, the diaphragm moves outward and the metering valve closes. This process repeats throughout the descent maintaining pressure in the spring chamber. essentially equal to the ambient pressure at all depths. During ascent, the internal pressure begins to exceed the ambient pressure; consequently the mushroom relief valve 32 opens in response to this pressure difference and allows the excess pressure to vent via holes 33. Thus internal pressure continues to equal ambient pressure throughout ascent.

It will therefore be understood by those skilled in the art that the particular embodiment of the invention here presented is by way of illustration only, and is meant to be in no way restrictive; therefore, numerous changes may be made, and the full use of equivalents resorted to, without departing from the spirit or scope of the invention as outlined in the appended claims.

What is claimed as invention is:

1. In a pressure regulator wherein said regulator includes an inlet port and an outlet port, and a control valve for controlling fluid flow from said inlet to said outlet port, spring-biased pressure sensing means having a first face exposed in a closed chamber, means for applying a reference pressure to said face, said reference pressure being substantially the same as ambient pressure, said pressure sensing means having a second face exposed to pressure of said outlet port, the improvement comprising a flexible external diaphragm having its outer face exposed to ambient pressure, a metering valve selectively connecting the interior of said diaphragm to said outlet port, said metering valve being operable by said external diaphragm so that, when ambient pressure rises, said diaphragm will move inwards, opening said metering valve for allowing fluid flow from said outlet port to said interior of said diaphragm for providing said reference pressure, an opening extending from within said interior of said diaphragm to said closed chamber for applying said reference pressure to said sensing means, and means for removing pressure in excess of ambient pressure from said chamber.

2. In a pressure regulator as claimed in claim 1, the further improvement wherein said means for removing pressure in excess of ambient pressure from said chamber comprises at least one opening defined in the wall of said closed chamber, and a flexible valve member covering said at least one opening.

3. In a pressure regulator as claimed in claim 1, the further improvement wherein said means for removing pressure in excess of ambient pressure from said chamber comprises at least one opening defined in said diaphragm, and a flexible valve member covering said at least one opening.

* * * * *